United States Patent [19]
Allen et al.

[11] Patent Number: 5,283,563
[45] Date of Patent: Feb. 1, 1994

[54] BACKLIGHTING OF NEMATIC CURVILINEAR ALIGNED PHASE LIQUID CRYSTAL DISPLAY PANELS

[75] Inventors: Gary R. Allen, Chesterland; John M. Davenport, Lyndhurst; William W. Finch, University Heights; Richard L. Hansler, Pepper Pike; Stuart C. Miller, Beachwood, all of Ohio

[73] Assignee: General Electric Company, Schenectady, N.Y.

[21] Appl. No.: 496,395

[22] Filed: Mar. 20, 1990

[51] Int. Cl.$^5$ .............................................. G09G 3/36
[52] U.S. Cl. ...................................... 345/102; 359/53
[58] Field of Search ............... 340/784, 716; 350/345; 359/53, 71, 88, 98

[56] References Cited

U.S. PATENT DOCUMENTS

| | | | |
|---|---|---|---|
| 3,838,565 | 10/1974 | Carlyle | 350/345 |
| 4,173,757 | 11/1979 | Hareng et al. | 340/784 |
| 4,214,820 | 7/1980 | Leibowitz et al. | 350/345 |
| 4,516,834 | 5/1985 | Cascini | 350/335 |
| 4,637,687 | 1/1985 | Haim et al. | 350/335 |
| 4,639,560 | 9/1985 | Wiley | 350/335 |
| 4,656,466 | 4/1987 | Yoshida et al. | 340/716 |
| 4,659,183 | 4/1987 | Suzawa | 350/345 |
| 4,838,661 | 6/1989 | McKee et al. | 350/345 |
| 4,915,479 | 4/1990 | Clarke | 350/345 |

Primary Examiner—Alvin E. Oberley
Assistant Examiner—Amare Mengistu
Attorney, Agent, or Firm—George E. Hawranko; Stanley C. Corwin

[57] ABSTRACT

A liquid crystal display (LCD) is provided with a source of backlighting which augments reflected incident light to provide increased contrast. A liquid crystal cell which does not contain dye, but becomes clear when a field is applied, is sandwiched in back of a liquid crystal cell with a dye and electrically connected so that when the front liquid crystal cell is turned ON to make selected portions of it transparent, the back liquid crystal cell is OFF so that corresponding portions of it are highly reflecting. No voltage is allowed to be applied across nonselected portions of the front liquid crystal and a voltage is applied across corresponding nonselected portions of the back liquid crystal making the nonselected portions of the back liquid crystal clear, producing a display of high contrast. Sandwiched to the rear of the back liquid crystal cell is a clear plastic wedge which is edge lighted. The edge lighted wedge only appears bright in the areas where the voltage on the back liquid crystal cell is OFF or not applied thereto.

11 Claims, 5 Drawing Sheets

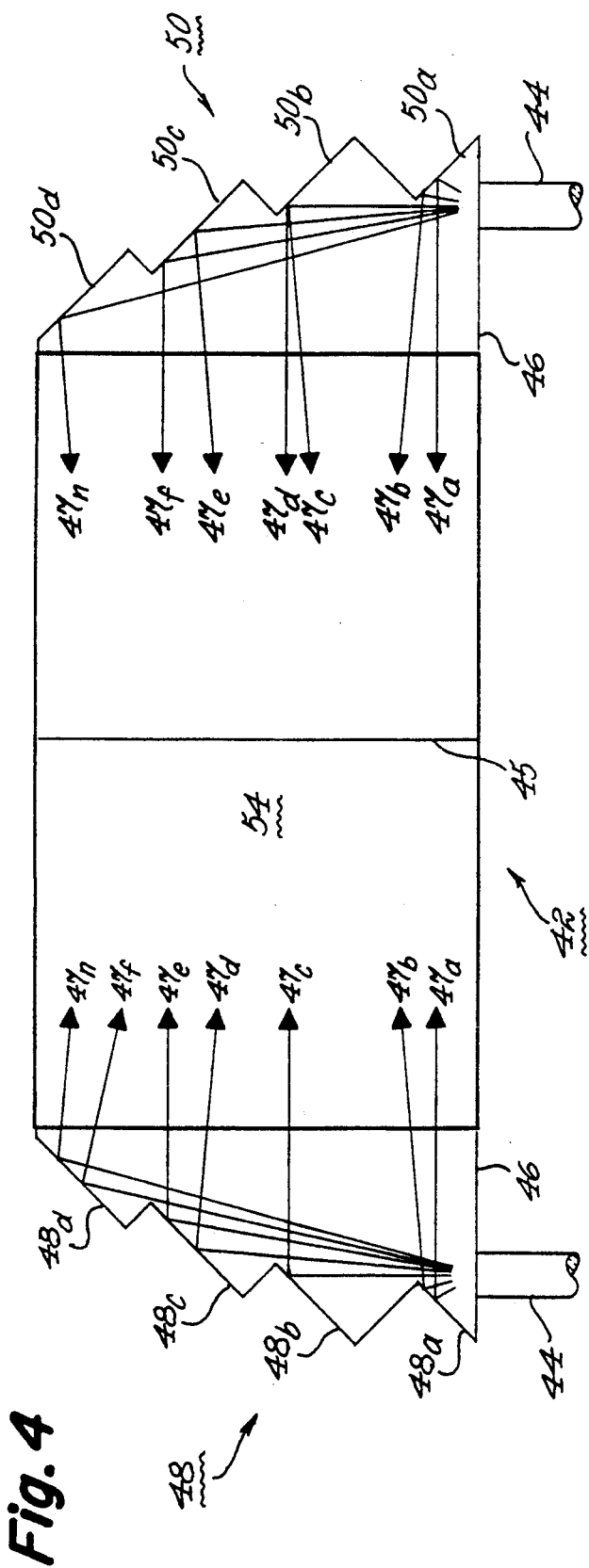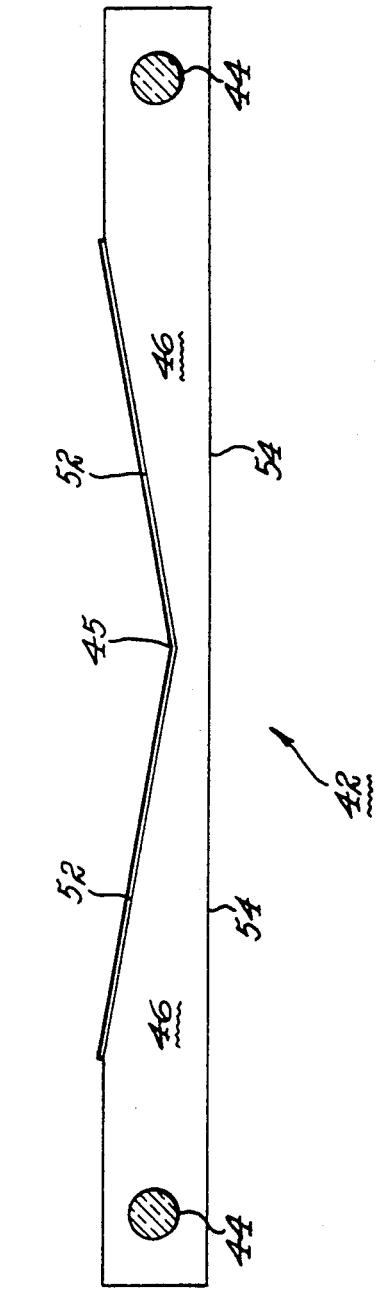
Fig. 4
Fig. 5

BACKLIGHTING OF NEMATIC CURVILINEAR ALIGNED PHASE LIQUID CRYSTAL DISPLAY PANELS

BACKGROUND OF THE INVENTION

1. Field of the Invention

The present invention generally relates to liquid crystal display panels and, more particularly, to backlighting of nematic curvilinear aligned phase (NCAP) liquid crystal display panels to improve contrast of the display which is particularly suited for automotive applications.

2. Description of the Prior Art

Liquid crystal displays (LCDs) are commonly used for a variety of applications ranging from personal televisions and computer displays to automotive applications. One of the principal reasons for the popularity of LCDs is their small size and low power consumption. On the other hand, the contrast of the display is limited and the angle at which the display must be viewed is critical for many LCDs which is a hindrance especially for automotive applications. Many LCD panels are dependent on front lighting in order to achieve significant contrast between the portion of the display that is ON and the portion that is OFF. The LCD material provides about 70% transmission in the ON state and 30% transmission when in the OFF state. This ratio (about 2.3) is not adequate for most purposes. A way the contrast is made useful is to cause the light to travel twice through the LCD by illuminating it from the front and reflecting the light back through the LCD to be viewed from the front. In this way 0.7 squared, or 0.49, is obtained when the panel is ON and 0.3 squared, or 0.09, is obtained when OFF for a ratio of 5.4, which is adequate. If slightly lower ON transmission is satisfactory, the ratio can be increased markedly. Using a translucent reflector in back of the LCD makes it possible to back light the panel but does not give sufficient contrast since the light only travels once through the LCD. Thus, backlighting of these single panel displays has been unsatisfactory.

An approach used in the prior art to address the problem of contrast in liquid crystal displays under a variety of lighting conditions is to provide a dual panel display with two modes of operation. For example, U.S. Pat. No. 4,516,834 to Cascini discloses a contrast enhanced LCD comprising two substantially identical LCDs with a transflector disposed in between such that light entering from the viewing surface of the first LCD is attenuated twice by the dark areas of the first LCD, and light entering from the rear of the second LCD is also attenuated twice, once by the rear LCD and once more by the front LCD. An electroluminescent panel is used as a backlight source when the display is used in a transmissive mode under poor ambient light conditions.

In another example, U.S. Pat. No. 4,637,687 to Haim et al discloses a cascaded, dual cell transflective LCD which comprises a pair of LCDs spaced from one another and having a transreflective element therebetween. A backlight source is positioned behind the second LCD and energized when the cascaded dual LCD is operated in its transmissive mode. In its reflective mode, ambient light passes through the front LCD and is reflected by the transreflective element to pass through the LCD to the viewer. Thus, the degree of contrast ratio in the reflective mode is determined by the degree of light absorption as the light passes through the unenergized background portions of the LCD twice. In the transmissive mode, light from the backlight source passes through the two LCDs, thereby providing the same contrast ratio as in the reflective mode.

U.S. Pat. No. 4,693,560 to Wiley discloses a double layer LCD which comprises first and second LCDs spaced from one another and a transflector disposed therebetween. The two LCDs comprise a liquid crystal material containing a dye that conforms to the structure of the liquid crystal material and a containment medium for inducing distorted alignment of the liquid crystal material which, in response to such alignment, scatters and absorbs light. A backlight source is placed on the nonviewing side of the second LCD. The Wiley display also has two modes of operation. At night, the display acts as a totally transmissive display wherein the contrast and brightness of the display are determined by the product of the performance of the two LCDs. In bright sun, the backlight source is turned OFF and the contrast ratio and brightness of the display are products of the double pass of incident light through only the front LCD.

SUMMARY OF THE INVENTION

It is therefore an object of the present invention to provide an improved backlit LCD display having a single mode of operation in which front lighting effectiveness is augmented by a backlight source.

It is another object of the invention to provide a backlit LCD display of superior contrast and brightness in any ambient light.

It is another object of the invention to provide a uniform backlight source for LCDs.

It is yet another object of the invention to provide a backlit LCD of simple and inexpensive construction.

According to the invention, a first or front liquid crystal cell, which contains dye and becomes clear when a field is applied, is sandwiched with a second or back liquid crystal cell which does not contain dye. The two liquid crystal cells are electrically connected so that when the first or front liquid crystal cell is turned ON to make it transparent, the second or back liquid crystal cell is OFF so that it is highly reflecting. Sandwiched to the back of the second liquid crystal cell is a clear plastic wedge which is edge lighted. The edge lighted wedge only appears bright in the areas where the voltage on the second or back liquid crystal cell is OFF. If a segment of the total display has the front liquid crystal cell ON and the corresponding segment of the back liquid crystal cell if OFF, and the rest of the display is reversed with regard to these ON-OFF conditions, then that segment will appear bright and the rest of the display will appear dark with high contrast.

The plastic wedge is applied to or formed integrally with a back surface of the second liquid crystal cell. Light is collected and concentrated from a high efficiency light source, and the concentrated light is focused as an input to one or more light guides, such as optical fibers. The light guides or fibers are fused or mated in some other way to an edge or edges of the wedge. The wedge shape increases the angle of internal reflections of the edge coupled light as the wedge gets thinner. In addition, the sloping back surface of the wedge intercepts more of the illuminating light beam as it progresses through the wedge toward its apex.

BRIEF DESCRIPTION OF THE DRAWINGS

The foregoing and other objects, aspects and advantages will be better understood from the following detailed description of a preferred embodiment of the invention with reference to the drawings, in which:

FIG. 4 is a top view of a double wedge embodiment of the invention;

FIG. 5 is an end view of the double wedge embodiment shown in FIG. 4; and

DETAILED DESCRIPTION OF THE PREFERRED EMBODIMENTS OF THE INVENTION

Figure 1:
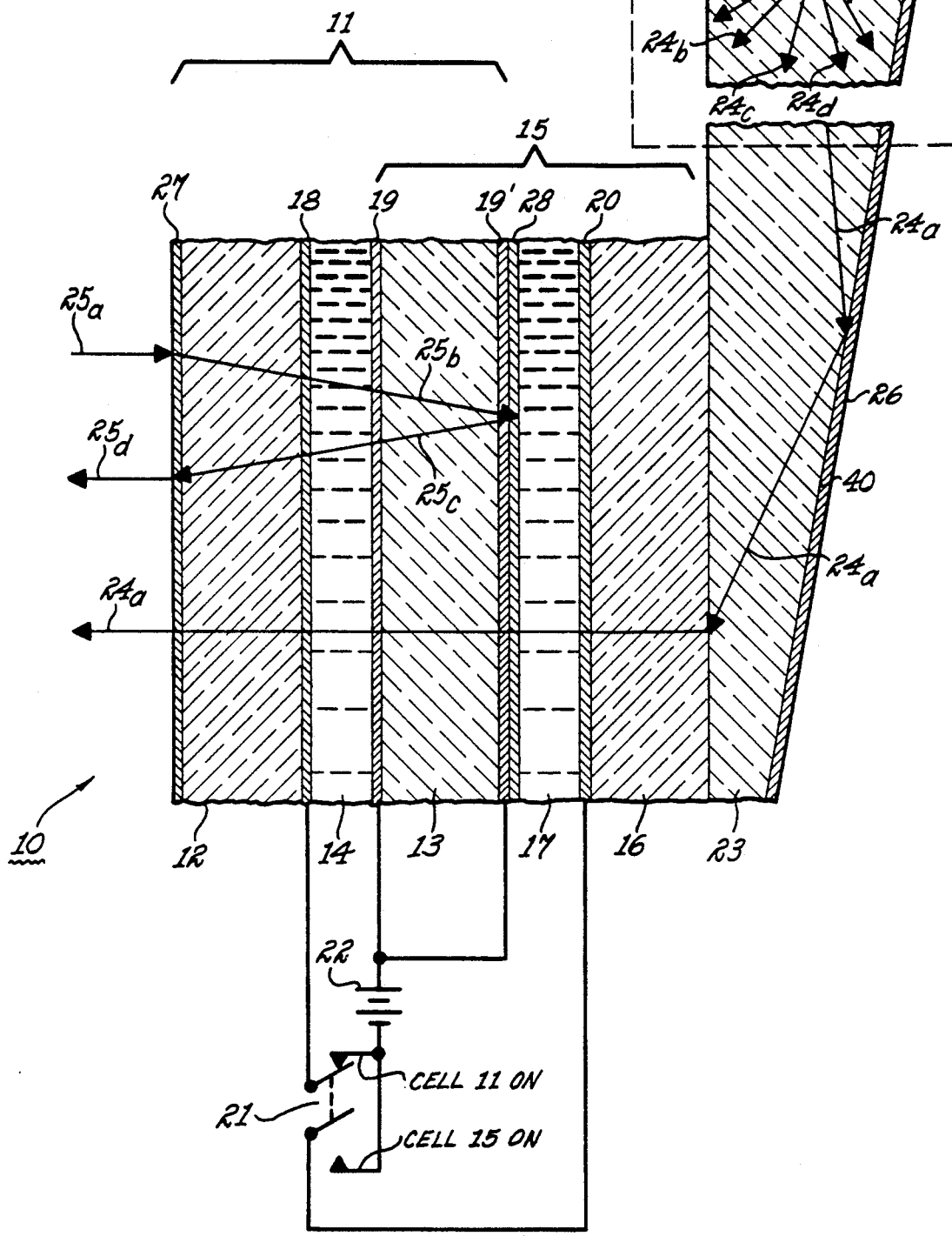
FIG. 1 is a cross-sectional side view of an LCD designed for back lighting using an edge-lit wedge according to the invention.

Referring now to the drawings, and more particularly to FIG. 1, there is shown a display panel 10 comprising a first or front liquid crystal cell 11 comprising a pair of optically transparent substrates 12 and 13 sealed by means of a plastic or glass frit seal, not shown, to form a first chamber in which a liquid crystal guest-host solution 14 is retained. The cell 11 is coincident with the front surface of the panel 10. The liquid crystal guest-host solution 14 contains a pleochroic or dichroic dye. The first liquid crystal cell 11 is sandwiched with a second or back liquid crystal cell 15 comprising the substrate 13 and a third optically transparent substrate 16, also sealed by means of a plastic or glass frit seal, not shown, to form a second chamber in which a liquid crystal guest-host solution 17 is retained. The liquid crystal guest-host solution 17 does not contain a dye. The liquid crystal guest-host solutions 14 and 17 are nematic curvilinear aligned phase (NCAP) liquid crystal solutions and may be of the type disclosed in U.S. Pat. No. 4,435,047 to Fergason.

The interior surfaces of the substrates 12, 13 and 16 are provided with optically transparent, electrically conductive coatings. Thus, substrate 12 is provided with a coating 18, substrate 13 is provided with coatings 19 and 19' applied to both surfaces since both surfaces are interior surfaces, and substrate 16 is provided with a coating 20. The coating 18 forms a front electrode for the liquid crystal cell 11, while the back electrode of cell 11 is the coating 19 on the surface of substrate 13 facing the interior surface of substrate 12. The coating 19' on the opposite surface of substrate 13 forms the front electrode of the second liquid crystal cell 15, while the back electrode for the second cell is formed by the coating 20. The coatings 18, 19, 19' and 20 may be made of indium-tin oxide deposited on the interior surfaces of the substrates in a known manner in the shape of display elements or indicia. In addition, the coatings 19 and 19' are electrically connected together. Thus, the basic construction comprises only three electrodes and only three substrates to define the two liquid crystal cells.

The conductive coatings 18, 19, 19' and 20 are electrically connected so that when the front liquid crystal cell 11 is turned ON to make selected portions of it transparent, the back liquid crystal cell 15 is OFF so that corresponding portions of it are highly reflecting. The ON-OFF control is established by switching means which is schematically illustrated by the single pole, double throw switch 21 connected to battery 22. It will be understood that the electrical connections shown are highly schematic and that similar connections are required to turn OFF or allow no voltage to be applied to nonselected portions of the front liquid crystal cell 11 and to turn ON corresponding portions of the back liquid crystal cell 15.

Sandwiched in the rear of the back liquid crystal cell 15, and in optical contact therewith, is a clear plastic wedge 23 which is edge lighted. The wedge 23 is shown as having a plurality of light rays 24a ... 24n to be described hereinafter with regard to FIG. 3. The method of edge lighting the wedge 23 is also described in more detail hereinafter. In general, an edge lighted clear plastic wedge 23 is placed in optical contact with the second liquid crystal cell 15. Light rays are propagated within the wedge 23 and are internally reflected except where the second liquid crystal 15 is diffusely reflecting such as that related to ray 24a to be described. The incident light 25a, to be described, which is transmitted through the first liquid crystal cell 11 and reflected by said second liquid crystal 15 is augmented by light ray 24a from the edge lighted plastic wedge 23.

The edge lighted wedge 23 only appears bright in the areas where the voltage across the second liquid crystal cell 15 is OFF so that the internal light rays 24a ... 24n of wedge 23 are being diffusely reflected. If a segment of the front liquid crystal cell 11 is ON and the corresponding segment of the back liquid cell 15 OFF, and the rest of the display reversed with regard to these ON-OFF conditions, then that segment will appear bright, as represented by light ray 24a and the rest dark with high contrast. When the front cell is lighted as it is represented by the conditions shown a light ray 25a of ambient light which first impinges the front of display 10, then continue onto as ray 25b which is reflected internally as ray 25c which then exits the display 10 as ray 25d. The panel 10 in this front cell lighted condition continues to work well with even higher contrast than obtained with prior art panels.

The function of the side lighted wedge 23 is to provide light only in those places where the field is turned OFF in the second liquid crystal cell 15. Total internal reflection is the mechanism by which a side lighted wedge 23 is able to propagate light to all parts of the LCD. Since the side lighted wedge 23 is placed in optical contact with the substrate 16, in that portion of the second liquid crystal cell 15 which is diffusely scattering, the light rays 24a ... 24n in the wedge 23 are able to escape into substrate 16. Use of a specular reflective coating 26 on the back of the wedge 23 further increases the brightness of which panel 10 may obtain.

The display 10 may be enhanced with a graphic overlay 27 of any desired configuration which is applied over the front substrate 12. Further, a color filter 28 may be added to the back liquid crystal cell 15, just behind the coating 19', to increase the contrast of the display.

Figure 2:
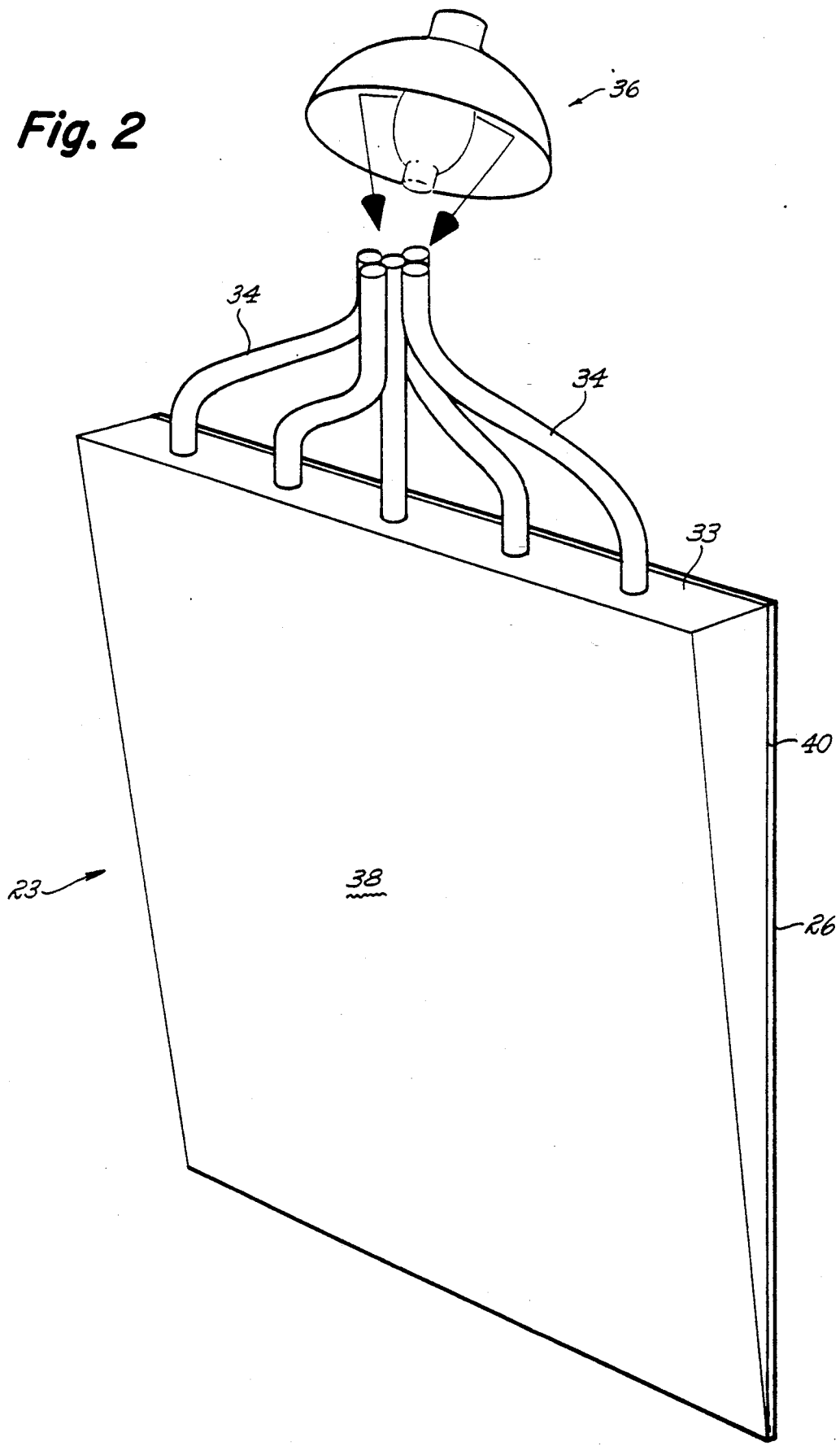
FIG. 2 is an isometric drawing of the basic wedge used to provide backlighting for the LCD.

Referring now to FIG. 2, there is shown a basic form of the wedge 23. The wedge may be made of a molded thermoplastic such as, for example, acrylics, polycarbonates or polystyrenes. Along the rectangular edge 33 of the wedge 23 are a plurality of optical fibers 34. The optical fibers 34 terminate in a common bundle which is positioned to collect concentrated light from a high efficiency source 36 which may be, for example, an arc lamp centrally located within a reflector preferably of a spherical shape. The coupling between the ends of the fibers 34 and the wedge 23 may be made by melting them together or mating in some other way so as to reduce any reflection losses and which provides for the light from the fibers to spread out in a direction perpendicular to the direction of the beam to provide uniform illumination over the front or light emitting surface 38 of wedge 23. The front surface 38 is arranged to be co-extensive with the second cell 16 for the embodiment of FIG. 1. The back surface 40, shown in FIG. 2 and partially shown in FIG. 3, of the wedge 23 is coated with a reflecting coating. Preferably, this reflecting coating is a specular type, such as sputtered aluminum.

Figure 3:
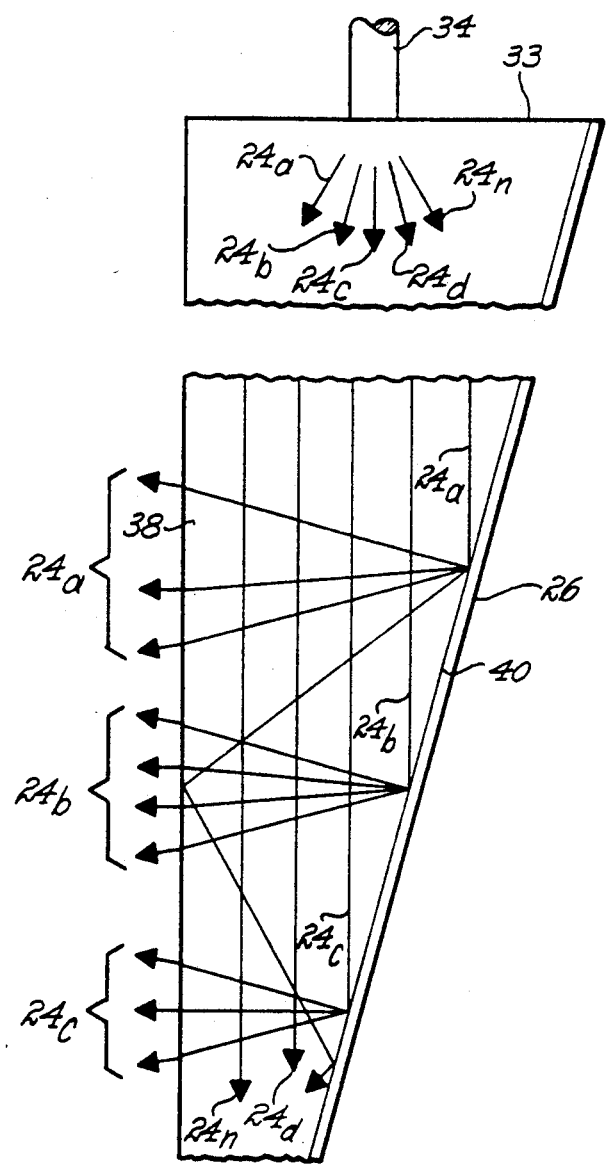
FIG. 3 is an enlarged cross-sectional view of the wedge shaped illuminating device shown in FIG. 2 illustrating the internal reflections of light within the device.

FIG. 3 illustrates the reflections of light from one of the optical fibers 34 within the volume of the wedge 23. The wedge 23 of FIG. 3 is shown somewhat different from that of FIG. 2 in that the back surface 40 is shown as converging to front surface 38. The challenge in back lighting an LCD is to make the illumination fairly uniform. To accomplish this using edge lighting, the wedge 23 increases the angle of the reflections per unit distance as the wedge gets thinner and the back or reflecting surface 40 intercepts more of the light beam, shown as rays 24a . . . 24n being emitted from fiber 34 located at the rectangular edge 33, as the light beam travels from edge 33 toward the apex of the wedge. The specular coating on the back surface 40 ensures that all of the light not absorbed by the surface 40 is reflected by surface 40 and comes out through the front surface 38 as groups of rays 24a, 24b and 24c.

Referring back to FIG. 1, the substrate 16 may be formed integrally with the wedge 23 by molding plastic such that the back surface of substrate 16 forms a wedge with the front surface of substrate 16 and such that this formed wedge may be illuminated by means of fiber optics at the thick end or edge of the wedge similar to rectangular edge 33 of wedge 23. For very large LCDs, it may be necessary to have a series of wedges, each fed by its own source, for example, the ends of optical fibers. As mentioned, the source of light 36 into the fibers may be a discharge lamp within a reflector or a similar high efficiency light source such as shown in FIG. 2.

It will be appreciated by those skilled in the art that there are several variables that must be considered in the practice of the invention. The first of these is the nature of the light beam introduced into the plastic wedge 23. Generally, it is preferred that the light beam be collimated, or nearly so, to achieve the best uniformity of illuminating light emitted from the front surface of the wedge. Secondly, the thickness and the angle of the wedge should be determined for the specific application.

A practical example of the invention is shown in FIGS. 4 and 5 which illustrate a double wedge illuminating device 42 fabricated to illuminate an LCD arrangement, in this case an automobile speedometer. The LCD arrangement may be such as that described with regard to FIG. 1. The double wedge structure is used to backlight the LCD arrangement of FIG. 1. In the embodiment shown in FIGS. 4 and 5, light is collected and concentrated from a high efficiency light source (not shown) as before. The concentrated light is focused as an input to a pair of light guides 44 which transmit light into device 42 comprised of double wedges 46. The double wedge shaped device 42 is best seen in FIG. 5 with regard to wedge portions 46. FIG. 5 shows the wedge portions 46 meeting at a central portion 45, whereas, FIG. 4 shows light rays 47a . . . 47n transmitted from fiber 44 into the device 42 at serrated edges 48 and 50. The edge 48 is comprised of portions 48a, 48b, 48c and 48d, whereas, edge 50 is comprised of portions 50a, 50b, 50c and 50d. As shown in FIG. 4, the expanding beams of light shown as rays 47a . . . 47n are intercepted by serrated edges 48 and 50 which reflect the light rays 47a . . . 47n toward the thinner central part of the double wedge device 42. The surfaces of the serrated edges 48 and 50 are preferably coated with a specular coating material, such as sputtered aluminum. In the illustrated embodiment, the serrations are designed such that the light beams are divided into seven parts of roughly equal lumens. The seven distributed light beams of the serrated edges 48 and 50 are reflected by the sloped back surface 52 shown in FIG. 5 of the double wedge device 42 and are emitted from the front surface 54 in the same manner as the generalized structure shown in FIG. 2.

Figure 6:
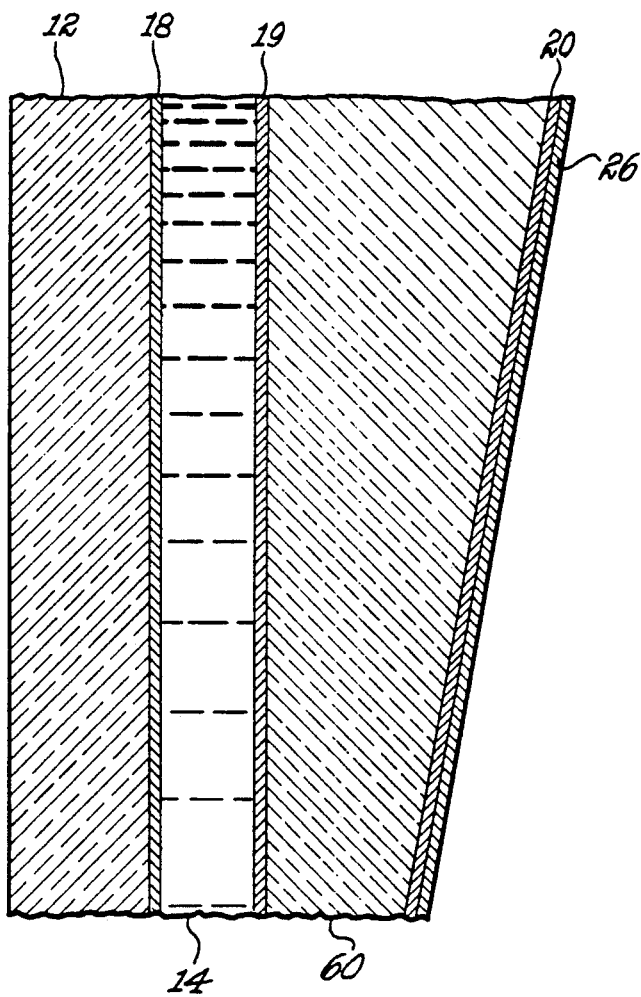
FIG. 6 is a cross-sectional side view of a modification of the LCD shown in FIG. 1 showing how that structure can be modified to simplify the construction of the device.

FIG. 6 shows a modification of the basic construction of FIG. 1. As already mentioned, the substrate 16 and the wedge 23 can be integrally molded, providing some simplification to the structure shown in FIG. 1. It is also possible to combine with the substrate 16 and the wedge 23, the liquid crystal 17 of the second liquid crystal and cell 15 along with the common substrate 13. Such a combined structure is indicated by reference numeral 60 in FIG. 6. This may be done by using encapsulated liquid crystals, such as those described in U.S. Pat. Nos. 4,435,047 and 4,616,903 to Fergason, within the plastic wedge 60. In this case, the electrically conductive coating 20 is applied to the back surface of the wedge 60, and only one electrically conductive coating 19 is required for the front of the wedge 60. The operation of the structure shown in FIG. 6 is entirely equivalent to that shown in FIG. 1, but with the advantage of greatly simplified construction.

While the invention has been described in terms of preferred embodiments with several modifications, those skilled in the art will recognize that the invention can be practiced with other modifications within the spirit and scope of the appended claims.

What we claim as new and desire to secure by Letters Patent of the United States is:

1. A backlighted liquid crystal display comprising:
   a first liquid crystal cell and a second liquid crystal cell disposed in a substantially aligned position relative to one another, said first liquid crystal cell having a first transparent substrate coincident with a front surface of said liquid crystal display and sealed with a second transparent substrate to form a first chamber containing a first liquid crystal, and said second liquid crystal cell being integral with said second transparent substrate and containing an encapsulated second liquid crystal, said first and second liquid crystal cells each including electrodes deposited on said first and second transparent substrates and connected to a source of voltage for applying a voltage across selected portions of said first and second liquid crystals;
   switching means connecting said electrodes to said source of voltage so that when a voltage is applied across a selected portion of said first liquid crystal causing the selected portion to become transparent, voltage is prevented from being applied across a corresponding portion of said second liquid crystal so that the corresponding portion is diffusely reflecting, said switching means further preventing voltage from being applied across nonselected portions of said first liquid crystal and applying a voltage across corresponding nonselected portions of said second liquid crystal, said switching means control of said nonselected portions associated with said first liquid crystal making the nonselected portions of said second liquid crystal clear; and an edge lighted clear wedge in optical contact with said second liquid crystal cell, light propagated within said wedge being internally reflected except where said second liquid crystal is diffusely reflecting, whereby incident light which is transmitted through said first liquid crystal cell and reflected by said second liquid crystal is augmented by light from said edge lighted plastic wedge.

2. A liquid crystal display recited in claim 1 wherein said third transparent substrate and said wedge are integrally formed of a moldable thermoplastic.

3. A liquid crystal display recited in claim 1 wherein said edge lighted wedge comprises:
a transparent wedge having back and front surfaces, at least one of which is converging, and a generally rectangular shaped edge between said surfaces, said front surface being co-extensive with an area of said second liquid crystal cell to be illuminated;
a high efficiency light source; and
at least one light guide optically coupling light from said light source to said rectangular shaped edge so that light entering the wedge is internally reflected from the back surface and emitted from said front surface where said second liquid crystal cell is diffusely reflecting.

4. A liquid crystal display recited in claim 3 wherein said wedge is formed of a plastic material.

5. A backlighted liquid crystal display as recited in claim 3 further comprising a diffuse reflective coating applied to said back surface.

6. A backlighted liquid crystal display comprising:
a first liquid crystal cell and a second liquid crystal cell, said first liquid crystal cell containing a first liquid crystal with a dye, and said second liquid crystal cell containing a second liquid crystal with no dye, said first and second liquid crystal cells each including electrodes connected to a source of voltage for applying a voltage across selected portions of said first and second liquid crystals;
switching means connecting said electrodes to said source of voltage so that when a voltage is applied across a selected portion of said first liquid crystal causing the selected portion to become transparent, voltage is prevented from being applied across a corresponding portion of said second liquid crystal so that the corresponding portion is diffusely reflecting, said switching means further being effective for preventing voltage from being applied across nonselected portions of said first liquid crystal and applying a voltage across corresponding nonselected portions of said second liquid crystal, said switching means control of said nonselected portions associated with said first liquid crystal making the nonselected portions of said second liquid crystal clear; and
an edge lighted clear plastic wedge in optical contact with said second liquid crystal cell, light propagated within said wedge being internally reflected except where said second liquid crystal is diffusely reflecting, whereby incident light which is transmitted through said first liquid crystal cell and reflected by said second liquid crystal is augmented by light from said edge lighted plastic wedge.

7. A liquid crystal display as recited in claim 1 wherein said second transparent substrate and said wedge are integrally formed of a moldable thermoplastic, said plastic wedge having back and front surfaces, at least one of which is converging, and a generally rectangular shaped edge between said surfaces.

8. A liquid crystal display as recited in claim 7 further comprising;
a high efficiency light source; and
at least one light guide optically coupling light from said light source to said rectangular shaped edge so that light entering the plastic wedge is internally reflected from the back surface and emitted from said front surface where said second liquid crystal cell is diffusely reflecting.

9. A backlighted liquid crystal display, comprising:
a first liquid crystal cell and a second liquid crystal cell disposed in an essentially aligned manner relative to one another, said first liquid crystal cell having a first transparent substrate coincident with a front surface of said liquid crystal display and sealed with a second transparent substrate to form a first chamber containing a first liquid crystal, and said second liquid crystal cell having a second chamber containing a second liquid crystal associated therewith, said second chamber being formed between a second pair of transparent substrates, said transparent substrates having electrodes disposed thereon such that voltage can be selectively applied across portions of said first and second liquid crystals;
switching means connecting said electrodes to a source of said voltage, said switching means being effective so that, when voltage is applied across a selected portion of said first liquid crystal rendering said selected portion transparent, voltage is prevented from being applied to a corresponding adjacent portion of said second liquid crystal thereby rendering said corresponding adjacent portion to be diffusely reflective, said switching means further being effective such that, when said selected portion is energized, voltage is prevented from being applied across non-selected portions of said first liquid crystal and coincident therewith, voltage is applied to corresponding non-selected adjacent portions of said second liquid crystal thereby rendering said non-selected adjacent portions transparent; and
a source of backlight disposed in optical contact with said second liquid crystal, said backlight source capable of providing a substantially uniform light across said second liquid crystal such that light propagated within said backlight source is internally reflected except where said second liquid crystal is diffusely reflective and whereby, incident light which is transmitted through said first liquid crystal cell and reflected by said second liquid crystal, is augmented by light from said backlight source.

10. A backlighted liquid crystal display as set forth in claim 9 wherein said second pair of transparent substrates is comprised of said second transparent substrate associated with said first liquid crystal cell and a third transparent substrate.

11. A backlighted liquid crystal display as set forth in claim 9 wherein said backlight source is an edge lighted wedge in optical contact with said second liquid crystal.

* * * * *